(12) United States Patent
Oh et al.

(10) Patent No.: US 7,846,583 B2
(45) Date of Patent: Dec. 7, 2010

(54) ELECTRODE MATERIAL CONTAINING MIXTURE OF POLYVINYL ALCOHOL OF HIGH DEGREE OF POLYMERIZATION AND POLYVINYL PYRROLIDONE AS BINDER AND LITHIUM SECONDARY BATTERY EMPLOYED WITH THE SAME

(75) Inventors: Eun-Suok Oh, Daejeon (KR); Young-Min Kim, Daejeon (KR); Juhyun Kim, Daejeon (KR); Ki Woo Chun, Daejeon (KR); Minjung Ryu, Seoul (KR); SeungRim Yang, Daejeon (KR); Min Ho Cho, Seoul (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 12/310,700

(22) PCT Filed: Aug. 24, 2007

(86) PCT No.: PCT/KR2007/004052
§ 371 (c)(1),
(2), (4) Date: Aug. 14, 2009

(87) PCT Pub. No.: WO2008/030001
PCT Pub. Date: Mar. 13, 2008

(65) Prior Publication Data
US 2009/0305139 A1  Dec. 10, 2009

(30) Foreign Application Priority Data
Sep. 4, 2006 (KR) .................... 10-2006-0084458

(51) Int. Cl.
*H01M 4/62* (2006.01)
(52) U.S. Cl. .................. 429/217; 429/212; 429/209
(58) Field of Classification Search .......... 429/217, 429/212, 231.95, 209, 218.1; 252/182.1
See application file for complete search history.

(56) References Cited

U.S. PATENT DOCUMENTS

| 6,242,133 | B1 | 6/2001 | Kato et al. | |
| 6,573,004 | B1 * | 6/2003 | Igarashi et al. | 429/217 |
| 6,946,218 | B2 * | 9/2005 | Crouch et al. | 429/130 |

FOREIGN PATENT DOCUMENTS

| JP | 10040916 A | 2/1998 |
| JP | 11067215 | 3/1999 |
| JP | 11067216 A | 3/1999 |
| JP | 11250915 | 9/1999 |
| JP | 2000-012006 A | 1/2000 |
| JP | 2003109596 | 4/2003 |
| JP | 2004134208 A | 4/2004 |
| KR | 20020011563 A | 2/2002 |
| KR | 2003-0032364 A | 4/2003 |
| KR | 20050022577 A | 3/2005 |
| KR | 20050047242 A | 5/2005 |
| KR | 20050085095 A | 8/2005 |
| WO | 2005011030 A1 | 2/2005 |

OTHER PUBLICATIONS

International Search Report, PCT/KR2007/004052.

* cited by examiner

*Primary Examiner*—Raymond Alejandro
(74) *Attorney, Agent, or Firm*—Lerner, David, Littenberg, Krumholz & Mentlik, LLP

(57) ABSTRACT

An electrode mix comprising a mixture of a polyvinyl alcohol with polyvinyl pyrrolidone as a binder and a lithium secondary battery comprising the same are disclosed. The electrode mix and lithium secondary battery according to the present invention enable stable maintenance of adhesion between active materials and/or adhesion between the active material and current collector and reduction of volumetric changes of anode active materials during repeated charge/discharge cycles, through the use of a polymer having an improved elongation percentage while exhibiting very high adhesive strength, as a binder of an electrode mix. Therefore, the present invention enables production of a large-capacity lithium secondary battery particularly using a silicon- or tin-based anode active material.

5 Claims, 1 Drawing Sheet

[Fig. 1]
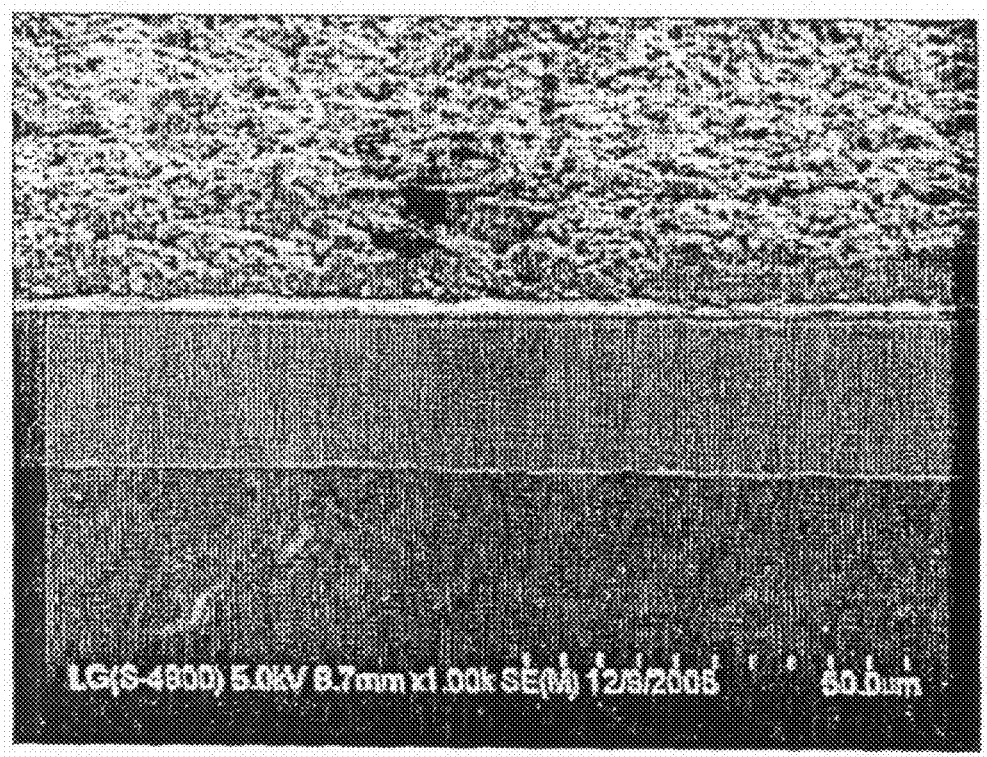
[Fig. 2]
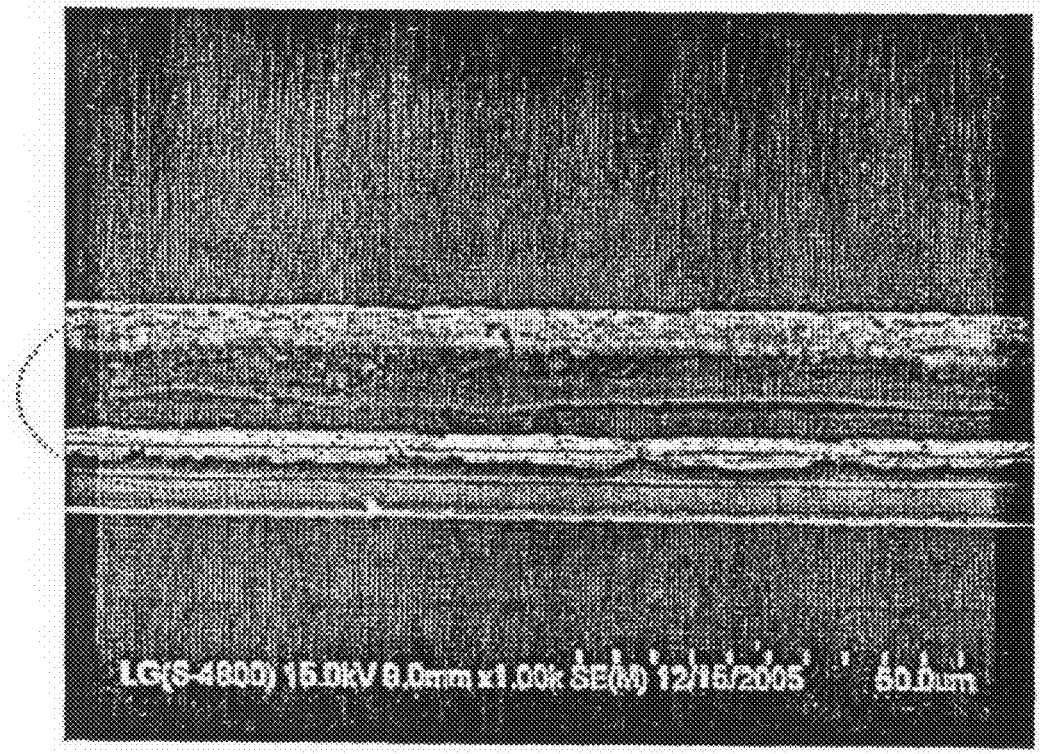

ELECTRODE MATERIAL CONTAINING MIXTURE OF POLYVINYL ALCOHOL OF HIGH DEGREE OF POLYMERIZATION AND POLYVINYL PYRROLIDONE AS BINDER AND LITHIUM SECONDARY BATTERY EMPLOYED WITH THE SAME

CROSS REFERENCE TO RELATED APPLICATIONS

The present application is a national phase entry under 35 U.S.C. §371 of International Application No. PCT/KR2007/004052, filed Aug. 24, 2007, published in English, which claims the benefit of Korean Patent Application No. 10-2006-0084458, filed Sep. 4, 2006. The disclosures of said applications are incorporated by reference herein.

TECHNICAL FIELD

The present invention relates to an electrode mix comprising a mixture of a polyvinyl alcohol having a high degree of polymerization with polyvinyl pyrrolidone as a binder and a lithium secondary battery comprising the same. More specifically, the present invention relates to an electrode mix comprising a mixture of polyvinyl pyrrolidone with a polyvinyl alcohol having a high degree of polymerization, as a binder which enables fabrication of a high-capacity battery by inhibiting volumetric changes of electrodes occurring during charge/discharge cycles to increase design capacity of the battery and further preventing occurrence of electrode cracking to thereby improve cycle characteristics of the battery, through the use of a physical mixture of a high-polymerization degree polyvinyl alcohol (PVA) having superior adhesive strength between an active material and a current collector and between the active materials in conjunction with polyvinyl pyrrolidone (PVP) having an excellent elongation percentage, as a binder for an anode; and a lithium secondary battery comprising the same.

BACKGROUND ART

Technological development and increased demand for mobile equipment have led to a rapid increase in the demand for secondary batteries as an energy source. Among these secondary batteries, lithium secondary batteries having high energy density and voltage are commercially available and widely used. The lithium secondary batteries generally use a lithium transition metal oxide as a cathode active material and a graphite-based material as an anode active material.

However, the anode formed of the graphite-based material has a maximum theoretical capacity of only 372 mAh/g (844 mAh/cc), thus suffering from a limited increase of capacity thereof. Consequently, such a graphite-based anode is incapable of carrying out a sufficient role as an energy source for next-generation mobile equipment undergoing rapid development and advancement. Further, lithium metals, studied for use as the anode material, have a very high energy density and thus may realize a high capacity, but raise problems associated with safety concerns due to growth of dendrites and a shortened cycle life as charge/discharge cycles are repeated. In addition, use of carbon nanotubes (CNTs) has been attempted as an anode active material, but various problems have been pointed out such as low productivity, expensiveness and low initial efficiency of less than 50%.

In this connection, a number of studies and suggestions have been recently proposed as to silicon, tin or alloys thereof, as they are known to be capable of performing reversible absorption (intercalation) and desorption (deintercalation) of large amounts of lithium ions through the reaction with lithium. For example, silicon (Si) has a maximum theoretical capacity of about 4020 mAh/g (9800 mAh/cc, a specific gravity of 2.23) which is substantially greater than the graphite-based materials, and thereby is promising as a high-capacity anode material.

However, upon performing charge/discharge processes, silicon, tin or alloys thereof react with lithium, thus undergoing significant changes of volume, i.e., ranging from 200 to 300%, and therefore repeated charge/discharge may result in separation of the anode active material from the current collector, or significant physicochemical changes at contact interfaces between the anode active materials, which are accompanied by increased resistance. Therefore, as charge/discharge cycles are repeated, the battery capacity sharply drops, thus suffering from a shortened cycle life thereof. For these problems, when a conventional binder for a graphite-based anode active material, i.e., polyvinylidene fluoride or styrene butadiene rubber, without any special treatment or processing, is directly applied to a silicon- or tin-based anode active material, it is impossible to achieve desired effects. In addition, when an excessive amount of a polymer as a binder is used to decrease volumetric changes occurring during charge/discharge cycles, separation of the active material from the current collector may be decreased slightly, but the electrical resistance of the anode is increased by an electrical insulating polymer used as the binder and the amount of the active material is relatively decreased, which consequently results in problems associated with a reduced battery capacity.

In order to cope with such problems, there is an urgent need for the development of a binder exhibiting superior adhesive strength and mechanical properties sufficient to withstand large volumetric changes of anode active materials occurring during a charge/discharge process in lithium secondary batteries using silicon- or tin-based anode active materials. In addition, conventional graphite-based lithium secondary batteries also require a strong need for the technique which is capable of improving the battery capacity by securing sufficient adhesion between the active material and the current collector and/or between the active materials, even with use of a small amount of the binder.

On the other hand, use of a polyvinyl alcohol has been attempted as a binder for an electrode of a lithium secondary battery (see Japanese Unexamined Patent Publication Nos. 1999-67216, 2003-109596 and 2004-134208). However, the above-mentioned polyvinyl alcohol binder exhibits superior adhesive strength, as compared to conventional binders, but suffers from a very low viscosity, non-uniform application of the binder on copper foil as a current collector and process problems associated with thermal treatment needed to improve adhesion between the electrode mix and the current collector. Further, the polyvinyl alcohol merely exhibits very insignificant effects to inhibit volumetric changes during charge/discharge cycling of the battery, due to a very low elongation percentage.

Other conventional prior arts focus on utilization of various polymers other than polyvinyl alcohols, as the binder.

For example, Korean Patent Application Publication No. 2002-011563 A1 discloses a lithium-sulfur battery exhibiting rapid electrochemical reaction, wherein a combination of polymers selected from a variety of polymers including polyvinyl alcohol and polyvinyl pyrrolidone is employed as the binder. Korean Patent Application Publication No. 2005-047242 A1 discloses an anode for a lithium secondary battery comprising an active material layer containing a polyolefin polymer and a water-soluble polymer, in which the water-soluble polymer is a thickening agent and is selected from the group consisting of carboxymethyl cellulose, polyvinyl alcohol, polyvinyl pyrrolidone and any combination thereof. Further, Korean Patent Application Publication No. 2005-085095 A1 discloses a binder composition comprising a vinylidene fluoride polymer having a functional group and/or a polar polymer having a carbonyl group, wherein the polar polymer includes at least one of an ethylene vinyl alcohol copolymer, a cellulose polymer, polyvinyl pyrrolidone and a vinylphenol polymer.

However, the aforementioned conventional arts merely exemplify various kinds of polymers that may be used as binders or active material additives, and do not suggest a mixture binder made of a certain combination in accordance with the present invention, as will be illustrated hereinafter. Further, none of the aforementioned prior arts teach or imply that selection of such a certain combination will bring about significant synergistic effects in adhesive strength and elongation percentage of the binder. In this connection, Experimental Examples that will be illustrated hereinafter presents analysis results of battery property and performance for the mixed binder of polyvinyl alcohol and polyvinyl pyrrolidone in accordance with the present invention, some binders of polymer combinations disclosed in the above-mentioned conventional arts, and a mixed binder of a low-molecular weight polyvinyl alcohol and polyvinyl pyrrolidone.

Meanwhile, when a conventional hydrogen storage electrode for an alkaline battery employs only the polyvinyl alcohol as the binder, adsorption of the polyvinyl alcohol to a hydrogen storage alloy powder results in separation of an electrode paste into the hydrogen storage alloy and water, which then leads to a decreased viscosity of the paste and significant changes in properties of the paste, thereby presenting problems associated with a deterioration of long-term storability of the paste and a decreased productivity of the hydrogen storage electrode. As an attempt to solve such problems, techniques involving addition of polyvinyl pyrrolidone are disclosed (see Japanese Unexamined Patent Publication No. 1998-040916 and U.S. Pat. No. 6,242,133). As an approach to solve the problem associated with an increased resistance of the electrode due to inhibition of ion migration resulting from coating of polyvinyl alcohol on the electrode, which is suffered by a paste-type cadmium electrode for an alkaline battery, there is also disclosed a technique of disrupting a polyvinyl alcohol-formed coating by further inclusion of polyvinyl pyrrolidone as a water-soluble sizing agent.

However, these techniques relate to binders that are incorporated into electrodes for alkaline batteries such as nickel-cadmium (Ni—Cd) batteries and nickel-hydrogen (Ni-MH) batteries. As compared to a lithium secondary battery, the alkaline battery exhibits a difference in active materials, electrolyte compositions, and the like, thereby leading to a difference in operation mechanisms during charge/discharge cycles. As a result, it is difficult to directly use the binder for electrodes of the alkaline battery in the lithium secondary battery, and practical applications of binders are also different therebetween.

Further, the adsorption problem of polyvinyl alcohol on the surface of electrodes of the alkaline battery occurs only when the polyvinyl alcohol having a low degree of polymerization is used. Such a fact can be clearly confirmed in working examples of the above Japanese Unexamined Patent Publication No. 1998-040916 wherein only the use of polyvinyl alcohol having a polymerization degree of 1500 is exemplified. Further, the inventors of the present invention have confirmed that the prolonged use of the polyvinyl alcohol having a polymerization degree of 1500 results in severe deterioration of the battery performance due to low electrolyte resistance, and particularly worsening of binder dissolution in the electrolyte upon continuous charge/discharge cycling at a high temperature. The secondary batteries easily reach a high temperature (for example, around 50° C.) during the continuous discharge process and the ensuing significant deterioration of the high-temperature performance may be an obstacle to impede the use of the secondary battery per se. Therefore, despite various suggestions of the conventional prior arts in connection with the alkaline batteries, the long-term use of the polyvinyl alcohol having a low polymerization degree in the lithium secondary battery has suffered from severe degradation of the battery performance, the fact of which can also be confirmed in the following examples.

DISCLOSURE OF INVENTION

Technical Problem

Therefore, the present invention has been made to solve the above problems and other technical problems that have yet to be resolved.

As a result of a variety of extensive and intensive studies and experiments to solve the problems as described above, the inventors of the present invention have discovered that a binder of the present invention, made by physical mixing of a high-polymerization degree polyvinyl alcohol, having superior adhesive strength to copper foil and current collectors but exhibiting a low elongation percentage with polyvinyl pyrrolidone that is completely miscible at any concentration and has a very high elongation percentage, exhibits superior battery property and performance via an optimum combination of the adhesive strength and elongation percentage, as compared to conventional binders. The present invention has been completed based on these findings.

Technical Solution

In accordance with an aspect of the present invention, the above and other objects can be accomplished by the provision of an electrode mix for a secondary battery, comprising a mixture of a polyvinyl alcohol having a polymerization degree of more than 3000 and a saponification degree of more than 80% with polyvinyl pyrrolidone, as a binder.

The polyvinyl alcohol having a high polymerization degree, a component of the binder in the electrode mix in accordance with the present invention, has high adhesivity to thereby provide superior binding force to active materials undergoing significant volumetric changes particularly during charge/discharge cycles. The other component, i.e. polyvinyl pyrrolidone, has a high elongation percentage to thereby prevent accumulation of stress that may occur during charge/discharge cycles, thus particularly improving cycle characteristics.

Even though basic properties of the polyvinyl alcohol and polyvinyl pyrrolidone are known in the art, it was confirmed that physical properties of the binder prepared by combination of these two components, as will be seen in the following Experimental Examples, exhibit significant improvements far beyond general expectations.

Accordingly, application of the electrode mix in accordance with the present invention to the secondary battery can maintain superior binding force between electrode active materials undergoing volumetric changes during charge/discharge cycles and/or between electrode active materials and current collectors, can suppress volumetric changes of the active materials during charge/discharge cycles to thereby increase a design capacity of the battery and prevent cracking of electrodes, and can also effectively scatter stress occurring upon charging/discharging to thereby achieve increased lifespan and improved cycle characteristics of the battery.

One of the important features of the present invention is to use PVA having a degree of polymerization much higher than conventionally known PVAs, as a binder for an electrode active material. Additionally, the PVA of the present invention is also required to have a high degree of saponification.

The PVA exhibits superior adhesive strength with the electrode active material as well as a surface of a current collector, via the action of hydroxyl groups which are repetitively present in the main chain of the polymer. Consequently, it is possible to achieve sufficient adhesion of the electrode active material with the current collector surface even by addition of a small amount of the PVA binder, as compared to prior art conventional binders, and it is also possible to provide a relatively high battery capacity and superior cycle characteristics by preventing the separation of the electrode active material from the current collector surface, resulting from the repeated charge/discharge cycles of the battery. Further, due to a higher electrical conductivity than any other polymers, the PVA of the present invention at the same content has a significantly low electrical resistance in the electrode and therefore exhibits superior high-rate charge/discharge characteristics.

Even though many efforts have been made on the use of the polyvinyl alcohol binder through combination of a polyvinyl alcohol with other polymers, copolymerization of the polyvinyl alcohol with other monomers, modification of terminal groups of the polyvinyl alcohol or the like, attempts or suggestions on the single use of polyvinyl alcohol as the binder has suffered from many limitations. One of the causes of such limitations may be the reason that it is not easy to prepare a polyvinyl alcohol having a degree of polymerization falling within the above-specified range.

However, the polymerization degree of the PVA according to the present invention is higher than 3000 as defined above. PVAs having a degree of polymerization lower than 3000 have disadvantages such as a low electrolyte resistance (i.e., readily soluble in the electrolyte), and partial dissolution in the electrolyte upon charge/discharge cycling of the battery, thereby resulting in an increased resistance of the electrolyte and the peeling of the electrode active material from the current collector, accompanied by a sharp drop of the charge/discharge capacity. Such a decreased resistance to the electrolyte is particularly pronounced when the battery is operated at a temperature higher than room temperature.

The degree of saponification of the PVA according to the present invention is 80% or higher, as defined above. If the degree of saponification is lower than 80%, the number of hydroxyl groups is decreased, which may undesirably result in lowering of adhesive strength.

Generally, a polyvinyl alcohol is prepared by hydrolysis of a polyvinyl alcohol precursor (polyvinyl acetate) obtained from polymerization of vinyl acetate ($CH_3COOCHCH_2$), as shown in Reaction Scheme I below, and Degree of Saponification is defined as a degree of hydrolysis.

<Reaction Scheme I>

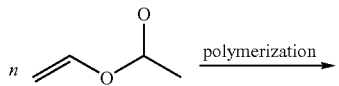

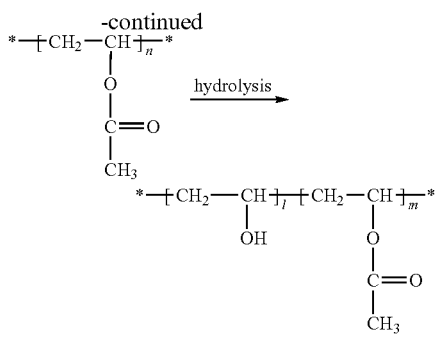

$$\text{Degree of Saponification} = \frac{l}{(l+m)}$$

The process for preparing PVAs having a high degree of polymerization and a high degree of saponification is disclosed in Korean Patent Application No. 2005-0136273, assigned to the present applicant, the disclosures of which are incorporated by reference herein in their entirety. The preparation of PVA having a high degree of polymerization and saponification will be briefly described hereinafter.

Distilled water and a given amount of PVA suspension (degree of saponification: 80%) are introduced and stirred in a reaction vessel which is then purged with nitrogen freed of oxygen and moisture. A radical initiator such as azobisbutyronitrile or azobisdimethylvaleronitrile and a vinyl acetate monomer are dissolved and introduced into the contents of the reaction vessel which are then elevated to a given temperature to proceed with polymerization, thereby preparing polyvinyl acetate having a high degree of polymerization. The thus-prepared polyvinyl acetate is filtered, washed and dried, and the dried product is dissolved in methanol. The resulting solution is allowed to proceed with the saponification reaction by adding a strong base, sodium hydroxide twice, thereby obtaining PVA. The polymerization degree of PVA thus prepared may be adjusted to a desired level within the above-specified range, depending upon an amount of an initiator and a reaction temperature. Therefore, it is possible to obtain PVA having a saponification degree of 99% or higher.

Basically, the above polyvinyl pyrrolidone is completely miscible with the polyvinyl alcohol by physical mixing, so it is possible to prevent heterogeneity of electrodes that may be caused by mixing of two polymer materials. Due to a high elongation property, polyvinyl pyrrolidone serves to increase an elongation percentage of the binder, thereby providing buffering effects against volumetric changes.

Even though there is no particular limit to the molecular weight of polyvinyl pyrrolidone, it may be difficult to exert a superior elongation percentage of polyvinyl pyrrolidone in the binder when the molecular weight of polyvinyl pyrrolidone is excessively low. Therefore, polyvinyl pyrrolidone preferably has a molecular weight of 1000 to 1,000,000.

A content of polyvinyl pyrrolidone is preferably in a range of 0.1 to 100 parts by weight, and more preferably 1 to 50 parts by weight, based on 100 parts by weight of polyvinyl alcohol. If the content of polyvinyl pyrrolidone is excessively low, the design capacity and charge/discharge efficiency of the battery may be decreased due to an insufficient elongation percentage of the binder. On the other hand, if the content of polyvinyl pyrrolidone is excessively high, a high affinity of polyvinyl pyrrolidone for water results in absorption and swelling of excessive amounts of water, which may bring about degradation of electrode adhesion and battery performance.

The content of the mixed binder in the electrode mix of the present invention is preferably in a range of about 1 to 50% by weight, based on the total weight of the electrode mix. If the content of the binder is too low, it may be difficult to withstand volumetric changes occurring upon charge/discharge cycling. On the other hand, if the content of the binder is too high, this undesirably leads to a decreased capacity and an increased resistance of the electrodes.

In addition to the electrode active materials, and the mixed binder, the electrode mix according to the present invention may further comprise at least one selected from the group consisting of a cross-linking accelerator, a viscosity adjuster, a conductive material, a filler, a coupling agent, an adhesive accelerator and any combination thereof.

The cross-linking accelerator is a material that facilitates cross-linking of the binder and may be added in an amount of 0 to 50% by weight, based on the weight of the binder. Examples of the cross-linking accelerator may include amines such as diethylene triamine, triethylene tetramine, diethylamino propylamine, xylene diamine and isophorone diamine, and acid anhydrides such as dodecyl succinic anhydride and phthalic anhydride. Besides them, polyamide resins, polysulfide resins, phenolic resins and the like may also be used as the cross-linking accelerator.

The viscosity adjuster is a component used to adjust the viscosity of the electrode mix, such that a mixing process of the electrode mix and an application process of the electrode mix to the current collector can be facilitated. The viscosity adjuster may be added in an amount of up to 30% by weight, based on the total weight of the electrode mix. Examples of the viscosity adjuster may include, but are not limited to, carboxymethyl cellulose and polyvinylidene fluoride. Where appropriate, the above-mentioned solvent may also serve as the viscosity adjuster.

The conductive material is a component used to further improve the conductivity of the electrode active material and may be added in an amount of 1 to 20% by weight, based on the total weight of the electrode mix. There is no particular limit to the conductive material, so long as it has suitable conductivity without causing chemical changes in the fabricated battery. As examples of conductive materials, mention may be made of conductive materials, including graphite such as natural or artificial graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The filler is an auxiliary component used to inhibit electrode expansion. There is no particular limit to the filler, so long as it does not cause chemical changes in the fabricated battery and is a fibrous material. As examples of the filler, there may be used olefin polymers such as polyethylene and polypropylene; and fibrous materials such as glass fibers and carbon fibers.

The coupling agent is an auxiliary component used to increase adhesive strength between the electrode active material and binder, and is characterized by having two or more functional groups. The coupling agent may be added in an amount of up to 30% by weight, based on the weight of the binder. The coupling agent may be a material in which one functional group forms a chemical bond via reaction with a hydroxyl or carboxyl group present on the surface of the silicon-, tin- or graphite-based active material, and the other functional group forms a chemical bond via reaction with the polymer binder. Specific examples of the coupling agent that can be used in the present invention may include, but are not limited to, silane-based coupling agents such as triethoxysilylpropyl tetrasulfide, mercaptopropyl triethoxysilane, aminopropyl triethoxysilane, chloropropyl triethoxysilane, vinyl triethoxysilane, methacryloxypropyl triethoxysilane, glycidoxypropyl triethoxysilane, isocyanatopropyl triethoxysilane and cyanatopropyl triethoxysilane.

The adhesive accelerator is an auxiliary component used to improve adhesive strength of the active material to the current collector, and may be added in an amount of less than 10% by weight, based on the weight of the binder. Examples of the adhesive accelerator that can be used in the present invention may include oxalic acid, adipic acid, formic acid, acrylic acid derivatives, itaconic acid derivatives and the like.

The electrode active material used in the present invention may be an active material for both the anode mix and cathode mix. Particularly preferred is an anode active material undergoing large volumetric changes during charge/discharge cycles.

As examples of the anode active material that can be used in the present invention, mention may be made of carbon and graphite materials such as natural graphite, artificial graphite, expanded graphite, carbon fibers, non-graphitizing carbon, carbon black, carbon nanotubes, fullerenes and activated carbon; metals such as Al, Si, Sn, Ag, Bi, Mg, Zn, In, Ge, Pb, Pd, Pt and Ti, which are alloyable with a lithium metal, and compounds containing such elements; a composite material of a metal or metal compound and a carbon or graphite material; and a lithium-containing nitride.

Among them, more preferred are the carbon-, silicon-, tin-, and silicon/carbon-based active materials, which may be used alone or in any combination thereof.

In particular, the mixed binder of the present invention can be more preferably used when it is desired to use, as an anode active material, the silicon-, tin- or silicon/carbon-based active material, which has a high theoretical capacity but undergoes significant volumetric changes during repeated charge/discharge cycles, thereby suffering limitations in the practical use thereof as the active material.

Examples of the cathode active material may include layered compounds such as lithium cobalt oxide ($LiCoO_2$) and lithium nickel oxide ($LiNiO_2$), or compounds substituted with one or more transition metals; lithium manganese oxides such as compounds of Formula $Li_{1+x}Mn_{2-x}O_4$ ($0 \leq x \leq 0.33$), $LiMnO_3$, $LiMn_2O_3$ and $LiMnO_2$; lithium copper oxide ($Li_2CuO_2$); vanadium oxides such as $LiV_3O_8$, $V_2O_5$ and $Cu_2V_2O_7$; Ni-site type lithiated nickel oxides of Formula $LiNi_{1-x}M_xO_2$ (M=Co, Mn, Al, Cu, Fe, Mg, B or Ga, and $0.01 \leq x \leq 0.3$); lithium manganese composite oxides of Formula $LiMn_{2-x}M_xO_2$ (M=Co, Ni, Fe, Cr, Zn or Ta, and $0.01 \leq x \leq 0.1$), or Formula $Li_2Mn_3MO_8$ (M=Fe, Co, Ni, Cu or Zn); $LiMn_2O_4$ wherein a portion of Li is substituted with alkaline earth metal ions; disulfide compounds; and $Fe_2(MoO_4)_3$; $LiFe_3O_4$, etc.

In accordance with another aspect of the present invention, there is provided an electrode for a secondary battery comprising the aforementioned binder-containing electrode mix applied to a current collector.

In the electrode according to the present invention, the current collector is the site where migration of electrons takes place in the electrochemical reaction of the electrode active material, and is divided into an anode current collector and a cathode current collector, depending upon kinds of electrodes.

The anode current collector is generally fabricated to have a thickness of 3 to 500□. There is no particular limit to the anode current collector, so long as it has suitable conductivity without causing chemical changes in the fabricated battery. As examples of the anode current collector, mention may be made of copper, stainless steel, aluminum, nickel, titanium, sintered carbon, copper or stainless steel having a surface treated with carbon, nickel, titanium or silver, and aluminum-cadmium alloys.

The cathode current collector is generally fabricated to have a thickness of 3 to 500□. There is no particular limit to the cathode current collector, so long as it has high conductivity without causing chemical changes in the fabricated battery. As examples of the cathode current collector, mention may be made of stainless steel, aluminum, nickel, titanium, sintered carbon and aluminum or stainless steel which was surface-treated with carbon, nickel, titanium or silver.

These current collectors may also be processed to form fine irregularities on the surfaces thereof so as to enhance adhesive strength to the electrode active materials. In addition, the current collectors may be used in various forms including films, sheets, foils, nets, porous structures, foams and non-woven fabrics.

The electrode for a secondary battery in accordance with the present invention may be used for both the anode and cathode. More preferred is the anode. In particular, the electrode of the present invention can be more preferably used when it is desired to use, as an anode active material, the silicon-, tin- or silicon/carbon-based active material, which has a high theoretical capacity but undergoes significant volumetric changes during repeated charge/discharge cycles, thereby suffering limitations in the practical use thereof as the active material.

The anode active material is intended to encompass silicon (Si) particles, tin (Sn) particles, silicon-tin alloy particles, silicon alloy particles, tin alloy particles, composites thereof and the like. Representative examples of the above-mentioned alloys include, but are not limited to, solid solutions, intermetallic compounds and eutectic alloys of Al—Si, Mn—Si, Fe—Si and Ti—Si. As one preferred example of the composite, a silicon/graphite composite may be used and is found in International Publication No. WO 2005/011030, assigned to the present applicant, the disclosures of which are incorporated by reference herein in their entirety. The graphite may be natural or artificial graphite. In addition, the form of graphite is not particularly limited and may be amorphous, plate-like, flaky or grain-like.

The secondary battery electrode is fabricated by coating a current collector with an electrode mix containing an electrode active material, a binder, and optionally a conductive material and/or a filler. Specifically, the electrode may be fabricated by adding the electrode mix to a solvent to thereby prepare a slurry, and applying the resulting slurry to the current collector such as metal foil, followed by drying and rolling, thereby obtaining a sheet-like electrode.

Preferred examples of solvents used in preparation of the electrode slurry may include dimethyl sulfoxide (DMSO) and N-methyl pyrrolidone (NMP). The solvent may be used in an amount of up to 400% by weight, based on the total weight of the electrode mix, and is removed during the drying process.

In accordance with yet another aspect of the present invention, there is provided a lithium secondary battery comprising the above-mentioned electrode. The lithium secondary battery is made of a structure in which an electrode assembly, composed of a cathode, an anode and a separator interposed therebetween, is impregnated within a lithium salt-containing, non-aqueous electrolyte.

When the binder of the present invention is used only in the anode out of two electrodes, the cathode may employ conventional binders known in the art. As examples of the conventional binders, mention may be made of polyvinylidene fluoride, polyvinyl alcohols, carboxymethylcellulose (CMC), starch, hydroxypropylcellulose, regenerated cellulose, polyvinyl pyrollidone, tetrafluoroethylene, polyethylene, polypropylene, ethylene-propylene-diene terpolymer (EPDM), sulfonated EPDM, styrene butadiene rubber, fluoro rubber, various copolymers, and polyvinyl alcohols having a high molecular weight and a high degree of saponification (DS).

The separator is interposed between the cathode and anode. As the separator, an insulating thin film having high ion permeability and mechanical strength is used. The separator typically has a pore diameter of 0.01 to 10□ and a thickness of 5 to 300□. As the separator, sheets or non-woven fabrics made of an olefin polymer such as polypropylene and/or a glass fiber or polyethylene, which have chemical resistance and hydrophobicity, are used. When a solid electrolyte such as a polymer is employed as the electrolyte, the solid electrolyte may also serve as both the separator and electrolyte.

The lithium salt-containing, non-aqueous electrolyte is composed of a non-aqueous electrolyte and a lithium salt. As the non-aqueous electrolyte, a liquid solvent, an organic solid electrolyte or an inorganic solid electrolyte may be utilized.

As the liquid solvent that can be used in the present invention, for example, mention may be made of aprotic organic solvents such as N-methyl-2-pyrollidinone, propylene carbonate, ethylene carbonate, fluoro ethylene carbonate, butylene carbonate, dimethyl carbonate, diethyl carbonate, gamma-butyro lactone, 1,2-dimethoxy ethane, tetrahydroxy Franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

As examples of the organic solid electrolyte utilized in the present invention, mention may be made of polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

As examples of the inorganic solid electrolyte utilized in the present invention, mention may be made of nitrides, halides and sulfates of lithium such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ and $Li_3PO_4$—$Li_2S$—$SiS_2$.

The lithium salt is a material that is readily soluble in the above-mentioned non-aqueous electrolyte and may include, for example, $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imide.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally include carbon dioxide gas.

BRIEF DESCRIPTION OF THE DRAWINGS

The above and other objects, features and other advantages of the present invention will be more clearly understood from the following detailed description taken in conjunction with the accompanying drawing, in which:

FIG. 1 is an SEM of an anode fabricated in Example 4; and
FIG. 2 is an SEM of an anode fabricated in Comparative Example 11.

MODE FOR THE INVENTION

Now, the present invention will be described in more detail with reference to the following examples. These examples are provided only for illustrating the present invention and should not be construed as limiting the scope and spirit of the present invention.

Preparation Example 1

149 g of distilled water and 1.13 g of a suspension containing 2 wt % of a polyvinyl alcohol (PVA) (degree of saponification: 88%) were introduced and stirred in a reaction vessel equipped with a baffle at 200 rpm. The reaction vessel containing the distilled water and suspension was purged with nitrogen gas containing no oxygen and moisture for 1 hour. 0.05 g of azobisdimethylvaleronitrile was dissolved in 75 g of a vinyl acetate monomer and introduced into the reaction vessel which was then elevated to a polymerization temperature of 30° C. to proceed with polymerization. The total reaction time was 10 hours, and the final conversion was 89%. The resulting polymerization products were washed, filtered and dried to obtain polyvinyl acetate. 500 g of a solution of the thus-prepared polyvinyl acetate in methanol (concentration: 10 wt %) was combined with 80 g of a solution of sodium hydroxide in methanol (concentration: 3 wt %) and the mixed solution was subjected to saponification at 40° C. for 1 hour. The solution was filtered and mixed with 460 g of methanol. 120 g of a sodium hydroxide solution in methanol (concentration: 3 wt %) was added to the resulting solution which was then subjected to secondary saponification at 40° C. for 1 hour. The weight-average degree of polymerization for the saponified polyvinyl alcohol was determined by gel permeation chromatography (two Waters Ultrahydrogel™ columns (Ultrahydrogel Linear and 250) connected in series, phosphate buffer, pH 6.7, Polystyrenesulfonate standard), and the degree of saponification thereof was confirmed by $^1$H-NMR analysis. As a result, the degree of polymerization was 4600, and the degree of saponification was 99%.

Example 1

5% by weight of a polyvinyl alcohol having a degree of polymerization (DP) of 4600 and a degree of saponification (DS) of more than 99%, prepared in Preparation Example 1, was dissolved in dimethyl sulfoxide (DMSO). To the resulting solution was added polyvinyl pyrrolidone having a molecular weight of 300,000 in an amount of 10% by weight of the polyvinyl alcohol. The resulting solution was coated to a thickness of 500□ on copper foil using a doctor blade, and was dried at 130° C. for 2 hours. Thereafter, the copper foil was removed to fabricate a polymer film.

Example 2

A polymer film was fabricated in the same manner as in Example 1, except that polyvinyl pyrrolidone was added in an amount of 30% by weight of the polyvinyl alcohol.

Comparative Example 1

Only 5% by weight of a polyvinyl alcohol having a degree of polymerization (DP) of 4600 and a degree of saponification (DS) of more than 99% was dissolved in dimethyl sulfoxide (DMSO). According to the same procedure as in Example 1, a polymer film was fabricated using the resulting solution.

Comparative Example 2

A polymer film was fabricated in the same manner as in Example 1, except that a polyvinyl alcohol having a degree of polymerization (DP) of 1700 and a degree of saponification (DS) of more than 88% was used, instead of a polyvinyl alcohol having DP of 4600 and DS of more than 99%.

Comparative Example 3

A polymer film was fabricated in the same manner as in Example 1, except that a polyvinyl alcohol having a degree of polymerization (DP) of 1800 and a degree of saponification (DS) of more than 99% was used, instead of a polyvinyl alcohol having DP of 4600 and DS of more than 99%.

Comparative Example 4

A polymer film was fabricated in the same manner as in Example 1, by dissolving 10% by weight of polyvinylidene fluoride, which has been used as a binder for a conventional lithium secondary battery, in N-methyl-2-pyrrolidone (NMP) as a dispersion medium.

Comparative Example 5

A polymer film was fabricated in the same manner as in Example 1, by dissolving 10% by weight of a copolymer of polyvinylidene fluoride having an excellent elongation percentage with polyhexafluoro propylene in N-methyl-2-pyrrolidone (NMP) as a dispersion medium.

Example 3

88 g of a silicon-graphite composite active material, 10 g of a polyvinyl alcohol having a degree of polymerization (DP) of 4600 and a degree of saponification ADS) of more than 99%, 1 g of polyvinyl pyrrolidone having a molecular weight of 300,000, and 2 g of carbon black as a conductive material were mixed in dimethyl sulfoxide as a solvent, and the total content of solids was adjusted to 30% by weight, thereby preparing a slurry. The resulting slurry was coated to a thickness of 100□ on copper foil using a doctor blade, and was dried in a drying oven at 130° C. for 30 min, followed by rolling it to an appropriate thickness to thereby fabricate an anode.

Example 4

An anode was fabricated in the same manner as in Example 3, except that 3 g of polyvinyl pyrrolidone was added.

Comparative Example 6

88 g of a silicon-graphite composite active material, 10 g of a polyvinyl alcohol having a degree of polymerization (DP) of 4600 and a degree of saponification (DS) of more than 99% as a binder, and 2 g of carbon black as a conductive-material were mixed in dimethyl sulfoxide (DMSO) as a solvent, and the total content of solids was adjusted to 30% by weight, thereby preparing a slurry. According to the same procedure as in Example 3, an anode was fabricated using the resulting slurry.

Comparative Example 7

An anode was fabricated in the same manner as in Example 3, except that 10 g of a polyvinyl alcohol having a degree of polymerization (DP) of 1700 and a degree of saponification (DS) of more than 88% was used, instead of a polyvinyl alcohol having DP of 4600 and DS of more than 99% as a binder.

Comparative Example 8

An anode was fabricated in the same manner as in Example 3, except that 10 g of a polyvinyl alcohol having a degree of polymerization (DP) of 1800 and a degree of saponification (DS) of more than 99% was used, instead of a polyvinyl alcohol having DP of 4600 and DS of more than 99% as a binder.

Comparative Example 9

An anode was fabricated in the same manner as in Comparative Example 6, except that N-methyl-2-pyrrolidone (NMP) was used instead of dimethyl sulfoxide (DMSO), as a solvent and 10 g of polyvinylidene fluoride was used instead of a polyvinyl alcohol.

Comparative Example 10

An anode was fabricated in the same manner as in Comparative Example 6, except that N-methyl-2-pyrrolidone (NMP) was used instead of dimethyl sulfoxide (DMSO) as a solvent and 10 g of a copolymer of polyvinylidene fluoride and polyhexafluoro propylene was used instead of a polyvinyl alcohol.

Comparative Example 11

An anode was fabricated in the same manner as in Comparative Example 6, except that 30 g of a solution of polyvinylidene fluoride (10 wt %) in N-methyl-2-pyrrolidone (NMP) was added.

Comparative Example 12

An anode was fabricated in the same manner as in Comparative Example 6, except that 30 g of a solution of a polyvinylidene fluoride-polyhexafluoro propylene copolymer (10 wt %) in N-methyl-2-pyrrolidone (NMP) was added

Comparative Example 13

An anode was fabricated in the same manner as in Comparative Example 6, except that N-methyl-2-pyrrolidone (NMP) was used instead of dimethyl sulfoxide (DMSO) as a solvent, and 10 g of polyvinylidene fluoride and 3 g of a polyvinylidene fluoride-polyhexafluoro propylene copolymer were used instead of 10 g of a polyvinyl alcohol.

Example 5

Anode plate fabricated in Examples 3 was pressed and punched into a round sample having a surface area of 1.49 $cm^2$ which was then used as a working electrode, and a round punched lithium metal foil having a surface area of 1.77 $cm^2$ was used as a counter electrode, thereby fabricating a coin-type half cell. A separator formed of a microporous polyolefin film was interposed between the working electrode and counter electrode, and an electrolyte of 1M $LiPF_6$ in a mixed solvent of ethyl carbonate (EC)/diethyl carbonate (DEC)/ethyl methyl carbonate (EMC) (volume ratio of 4:3:3) was injected into the resulting electrode assembly to thereby fabricate a lithium secondary battery.

Example 6

A lithium secondary battery was fabricated in the same manner as in Example 5, except that the anode fabricated in Example 4 was used.

Comparative Example 14

A lithium secondary battery was fabricated in the same manner as in Example 5, except that the anode fabricated in Comparative Example 6 was used.

Comparative Example 15

A lithium secondary battery was fabricated in the same manner as in Example 5, except that the anode fabricated in Comparative Example 7 was used.

Comparative Example 16

A lithium secondary battery was fabricated in the same manner as in Example 5, except that the anode fabricated in Comparative Example 8 was used.

Comparative Example 17

A lithium secondary battery was fabricated in the same manner as in Example 5, except that the anode fabricated in Comparative Example 9 was used.

Comparative Example 18

A lithium secondary battery was fabricated in the same manner as in Example 5, except that the anode fabricated in Comparative Example 10 was used.

Comparative Example 19

A lithium secondary battery was fabricated in the same manner as in Example 5, except that the anode fabricated in Comparative Example 11 was used.

Comparative Example 20

A lithium secondary battery was fabricated in the same manner as in Example 5, except that the anode fabricated in Comparative Example 12 was used.

Comparative Example 21

A lithium secondary battery was fabricated in the same manner as in Example 5, except that the anode fabricated in Comparative Example 13 was used.

EXPERIMENTAL EXAMPLES

The following experiments were carried out to analyze characteristics of polymer films and electrodes fabricated according to the present invention.

Experimental Example 1

In order to measure the elongation percentage of the polymer films of the present invention, experiments were carried out according to ASTM D638 standard test method. The experimental results thus obtained are given in Table 1 below. For evaluation, the elasticity was measured for more than 5 samples and the average value was calculated.

TABLE 1

|  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Elongation (%) | 127 | 163 | <50 | 97 | 116 | <50 | 278 |

As can be seen from Table 1, the polymer films made of a physical mixture of a polyvinyl alcohol having a high degree of polymerization with polyvinyl pyrrolidone exhibited very excellent elasticity.

Experimental Example 2

In order to measure the swelling degree of the polymer films in a lithium salt-free electrolyte, EC (ethyl carbonate), DEC (diethyl carbonate) and EMC (ethyl-methyl carbonate) were mixed in a ratio of 4:3:3 (v/v). The polymer films fabricated in Examples 1 and 2 and Comparative Examples 1 to 5 were cut into round samples having a diameter of 1 cm, and soaked in 10 mL of the resulting mixed solution which was then sealed and stored in incubators at 25° C. and 50° C. 72 hours later, the films were taken from the electrolyte and the remaining electrolyte on the film surface was wiped with a dry paper, followed by measuring changes in the weight of films relative to the initial weight. The swelling rate of the polymer films in the electrolyte was calculated according to the following equation. For evaluation, the swelling rate (%) was measured for more than 5 samples and the average value was calculated. The experimental results thus obtained are given in Table 2 below.

Swelling rate(%)=(weight after soaking in electrolyte−weight before soaking in electrolyte)/(weight before soaking in electrolyte)100

TABLE 2

|  | Ex. 1 | Ex. 2 | Comp. Ex. 1 | Comp. Ex. 2 | Comp. Ex. 3 | Comp. Ex. 4 | Comp. Ex. 5 |
|---|---|---|---|---|---|---|---|
| Swelling (%) at 25° C. | 2.18 | 3.74 | 1.25 | −4.25 | −3.18 | 2.67 | 12.18 |
| Swelling (%) at 50° C. | 3.56 | 4.81 | 1.64 | −11.97 | −6.53 | 4.59 | 18.31 |

As can be seen from Table 2, a polyvinyl alcohol having a low degree of polymerization (Comparative Examples 2 and 3) was dissolved in a carbonate-based electrolyte to thereby decrease a swelling rate and a degree of swelling decrease was more pronounced at a high temperature. On the other hand, a physical mixture of the polyvinyl alcohol having a high polymerization degree with polyvinyl pyrollidone (Examples 1 and 2) exhibited a slight increase in the swelling rate, as compared to a single use of the polyvinyl alcohol having a high polymerization degree (Comparative Example 1).

Experimental Example 3

In order to measure the adhesive strength between an electrode active material and a current collector when the polymer films of the present invention were used as a binder, the surface of the fabricated electrode was cut into a given size and mounted on a slide glass. Then, the current collector was peeled off while 180-degree peel strength was measured. The results thus obtained are given in Table 3 below. For evaluation, the peel strength was measured for more than 5 samples and the average value was calculated.

TABLE 3

|  | Ex. 3 | Ex. 4 | Comp. Ex. 6 | Comp. Ex. 7 | Comp. Ex. 8 |
|---|---|---|---|---|---|
| Electrode adhesive strength (g/cm) | 1933 | 1851 | 1999 | 13 | 175 |

|  | Comp. Ex. 9 | Comp. Ex. 10 | Comp. Ex. 11 | Comp. Ex. 12 | Comp. Ex. 13 |
|---|---|---|---|---|---|
| Electrode adhesive strength (g/cm) | 21 | <10 | 1338 | 1170 | 28 |

As can be seen from Table 3, when the adhesive strength of the fresh electrode was measured, physical mixing with polyvinyl pyrrolidone exhibited substantially no influence on the adhesive strength of the polyvinyl alcohol having a high polymerization degree (Examples 3 and 4, and Comparative Example 6). However, it can be seen that physical mixing of the polyvinyl alcohol with polyvinylidene fluoride and polyvinylidene fluoride-polyhexafluoro propylene copolymers, which are used in conventional carbon-based electrodes, leads to a significant decrease in the adhesive strength of the polyvinyl alcohol, due to various problems such as dispersion of components arising from the use of two solvents (Comparative Examples 6, 11 and 12). In order to confirm these results, SEMs of anodes fabricated in Example 4 and Comparative Example 11 are shown in FIGS. 1 and 2, respectively. Referring to these drawings, it can be seen that the anode of Comparative Example 11 exhibits a non-adhesion part at an interface between the copper foil and the active material.

Further, it can be seen that the physical mixture binder of polyvinyl alcohol/polyvinyl pyrollidone exhibits superior adhesive strength, as compared to the polyvinylidene fluoride binder, the copolymer binder of polyvinylidene fluoride having a superior elongation percentage with polyhexafluoro propylene, and combination binders thereof, which are used in conventional carbon-based electrodes (Examples 3 and 4, and Comparative Examples 9, 10 and 13).

Further, it can be seen that desired adhesive strength is not obtained with a polyvinyl alcohol having a low degree of polymerization, even when it is mixed with polyvinyl pyrollidone (Examples 3 and 4, and Comparative Examples 7 and 8).

Experimental Example 4

In order to evaluate the performance of coin cell batteries, 2 cycles of charge/discharge at 0.1 C rate and 50 cycles of charge/discharge at 0.5 C rate were respectively repeated for the batteries, according to a constant-current/constant-voltage method. The initial capacity and initial efficiency, the efficiency after charge/discharge cycling, and the volume expansion were compared between the respective batteries. For this purpose, more than 5 coin cell batteries were respectively fabricated for the same binder composition, and evaluation was carried out and the average value was calculated. The results thus obtained are given in Table 4 below.

TABLE 4

|  | Initial capacity (mAh/g) | Initial efficiency (%) | Electrode volume expansion after 50 cycles (%) | 50-cycle efficiency (%) | 200-cycle efficiency (%) |
| --- | --- | --- | --- | --- | --- |
| Ex. 5 | 1995 | 85.0 | 495 | 88.9 | 65.7 |
| Ex. 6 | 1987 | 84.7 | 413 | 89.2 | 66.5 |
| Comp. Ex. 14 | 1944 | 85.1 | 598 | 86.1 | 53.2 |
| Comp. Ex. 15 | 1929 | 84.8 | — (Active material separated) | <40 | — |
| Comp. Ex. 16 | 1938 | 84.7 | — (Active material separated) | <40 | — |
| Comp. Ex. 17 | 1823 | 78.0 | — (Active material separated) | <40 | — |
| Comp. Ex. 18 | 1840 | 79.4 | — (Active material separated) | <40 | — |
| Comp. Ex. 19 | 1928 | 83.2 | 605 | 74.3 | 30.6 |
| Comp. Ex. 20 | 1916 | 83.6 | 576 | 73.7 | 28.8 |
| Comp. Ex. 21 | 1825 | 78.5 | — (Active material separated) | <40 | — |

As can be seen from Table 4, the use of a physical mixture binder of a polyvinyl alcohol having a high degree of polymerization with polyvinyl pyrollidone (Examples 5 and 6) exhibited similarities in the initial efficiency and initial capacity while providing a decreased volume expansion. Therefore, it is possible to achieve an increased design capacity of the battery, and improved cycle characteristics of the battery, as compared to a single use of a polyvinyl alcohol as a binder (Comparative Example 14). As can be seen from the volume expansion rate given in Table 4, this is because, as discussed hereinbefore, physical mixing of the high-polymerization degree polyvinyl alcohol having superior adhesion (see Table 3) with polyvinyl pyrollidone having a superior elongation percentage (see Table 1) maintains the adhesive strength of the electrode and minimizes occurrence of electrode cracking, during charge/discharge cycles.

Further, the battery of the present invention exhibited all superior initial capacity, initial efficiency and cycle efficiency, as compared to the battery using the conventional polyvinylidene fluoride binder (Comparative Example 17) or the polyvinylidene fluoride-polyhexafluoro propylene copolymer binder (Comparative Example 18). In addition, the battery of the present invention exhibited a superior battery property, as compared to other batteries using a dual binder system (Comparative Examples 19, 20 and 21).

Further, it can be seen that the battery using a mixture of the low-polymerization degree polyvinyl alcohol with polyvinyl pyrollidone as the binder (Comparative Examples 15 and 16), as illustrated in previous Experimental Examples, exhibits poor solvent resistance against carbonate-based electrolytes and low adhesive strength, and therefore has significantly inferior battery performance, as compared to the battery using the high-polymerization degree polyvinyl alcohol as the binder (Examples 4 and 6).

INDUSTRIAL APPLICABILITY

As apparent from the above description, a mixed binder of a high-polymerization degree polyvinyl alcohol with polyvinyl pyrollidone according to the present invention and a lithium secondary battery comprising the same enable stable maintenance of adhesion between active materials and/or adhesion between the active material and current collector and reduction of volumetric changes of anode active materials during repeated charge/discharge cycles, through the use of a polymer having an improved elongation percentage while exhibiting very high adhesive strength as a binder of an electrode mix. Therefore, the present invention enables commercialization of a high-capacity silicon- or tin-based anode active material, and it is thus possible to manufacture a large-capacity lithium secondary battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium secondary battery, comprising a mixture of a polyvinyl alcohol having a polymerization degree of more than 3000 and a saponification degree of more than 80% with polyvinyl pyrrolidone, as a binder, wherein, the content of polyvinyl pyrrolidone is in the range of 0.1 to 100 parts by weight, based on 100 parts by weight of the polyvinyl alcohol; and wherein, the content of the binder is in the range of 1 to 50% by weight, based on the total weight of the electrode mix.

2. The lithium secondary battery according to claim 1, wherein the polyvinyl pyrrolidone has a molecular weight of 1000 to 1,000,000.

3. The lithium secondary battery according to claim 1, wherein the mix further comprises at least one selected from the group consisting of a cross-linking accelerator, a viscosity adjuster, a conductive material, a filler, a coupling agent, an adhesive accelerator and any combination thereof.

4. The lithium secondary battery according to claim 1, wherein the binder is used in an anode.

5. The lithium secondary battery according to claim 4, wherein the anode comprises a carbon-based, silicon-based, tin-based or silicon/carbon-based active material.

\* \* \* \* \*

UNITED STATES PATENT AND TRADEMARK OFFICE
CERTIFICATE OF CORRECTION

PATENT NO.        : 7,846,583 B2
APPLICATION NO.   : 12/310700
DATED             : December 7, 2010
INVENTOR(S)       : Eun-Suok Oh et al.

Page 1 of 1

It is certified that error appears in the above-identified patent and that said Letters Patent is hereby corrected as shown below:

Column 3, line 21, "presents" should read -present-
Column 4, line 45, delete "," after "pyrrolidone"
Column 5, line 34, "has" should read -have-
Column 6, line 24, "disclosures of which are" should read -disclosure of which is-
Column 9, line 5, missing symbol should read -D-
Column 9, line 14, missing symbol should read -D-
Column 10, line 19, missing symbol should read -D-
Column 10, line 20, missing symbol should read -D-
Column 12, line 3, missing symbol should read -D-
Column 12, line 64, missing symbol should read -D-
Column 13, line 63, insert --.-- at end of paragraph
Column 18, line 64, delete "," after "pyrrolidone"

Signed and Sealed this
Thirteenth Day of March, 2012

David J. Kappos
*Director of the United States Patent and Trademark Office*